United States Patent [19]

Dellavecchia

[11] 4,255,219
[45] Mar. 10, 1981

[54] PROCESS FOR MAKING COMPOSITE LAMINATED POLYAMIDE SHEET MATERIAL

[75] Inventor: Michael P. Dellavecchia, Sparta, N.J.

[73] Assignee: Allied Chemical Corporation, Morris Township, Morris County, N.J.

[21] Appl. No.: 937,393

[22] Filed: Aug. 28, 1978

Related U.S. Application Data

[62] Division of Ser. No. 815,381, Jul. 13, 1977, abandoned.

[51] Int. Cl.$^3$ ............... B29D 7/02; B32B 27/34
[52] U.S. Cl. ............... 156/243; 156/244.11; 156/244.12; 156/244.27; 428/288; 428/297; 428/303; 428/435
[58] Field of Search ............. 156/243, 244.11, 244.12, 156/244.23, 244.24, 244.27; 428/288, 297, 298, 302, 303, 325, 426, 435

[56] References Cited

U.S. PATENT DOCUMENTS

| 3,416,990 | 12/1968 | Robinson | 428/441 |
| 3,684,645 | 8/1972 | Temple et al. | 428/220 |
| 3,840,426 | 10/1974 | Flautt et al. | 428/435 |
| 3,920,879 | 11/1975 | Segal et al. | 428/288 |
| 3,931,094 | 1/1976 | Segal et al. | 260/37 N |
| 3,951,127 | 4/1976 | Watson et al. | 252/70 X |
| 4,015,039 | 3/1977 | Segal et al. | 428/303 |
| 4,098,943 | 7/1978 | Degginger et al. | 156/244.12 |

Primary Examiner—Caleb Weston
Attorney, Agent, or Firm—Richard A. Negin

[57] ABSTRACT

A thermoplastic sheet material useful in forming multilayer composites, said sheet material being formed of at least one layer comprising polyepsiloncaprolactam and about 0.05 to 1 percent by weight, based upon the weight of the polyepsiloncaprolactam, of a dibasic carboxylic acid or anhydride or esters thereof and at least one reinforcing mat of long glass fibers encased within said layer.

3 Claims, No Drawings

PROCESS FOR MAKING COMPOSITE LAMINATED POLYAMIDE SHEET MATERIAL

This is a division of Application Ser. No. 815,381, filed July 13, 1977, abandoned.

BACKGROUND OF THE INVENTION

1. Field of the Invention

This invention relates to improvements in thermoplastic nylon composite sheets useful in forming stamped articles, to a method for forming such sheets and to components thereof.

2. Description of the Prior Art

Composite thermoplastic sheets, such as sheets formed of polyamides, for example, polyepsiloncaprolactam which is also known as nylon 6, have heretofore been utilized to provide smooth-surfaced stamped articles which have the requisite mechanical properties to be utilized in automotive and other applications. Exemplary of such composite sheets and processes for forming the same as those disclosed in U.S. Pat. Nos. 3,931,094 to Segal et al., 3,920,879 to Segal et al., 4,015,039 to Segal et al., as well as U.S. Application Ser. No. 616,732 filed Sept. 25, 1975 to Degginger et al. Typical of such compositions, such as is described in the aforementioned U.S. application (which is expressly incorporated herein by reference) is a composition formed of (a) at least one layer comprising from about 40 to 70 weight percent of polyepsiloncaprolactam, about 0 to 50 weight percent of a particulate filler, and about 0 to 35 weight percent of short glass fibers and (b) a reinforcing layer adjoining layer (a) and comprising from about 60 to 95 weight percent of polyepsiloncaprolactam, about 5 to 40 weight percent of a long glass fiber mat and about 0 to 40 weight percent of a particulate filler.

In forming such sheets, typically the first layer is extruded, the second layer (absent the fiber glass) is also extruded and both such layers, together with the long glass mat positioned between the layers, are laminated together while the resin of the second layer is still in a molten condition.

Although the above-described composites in general have the desired physical properties and surface smoothness, at times the reinforcing layer provides a less than desired reinforcement to the composite. It will be desirable if the reinforcing properties of the composite sheet were less variable.

SUMMARY OF THE INVENTION

In accordance with this invention, there is provided a thermoplastic sheet material useful in forming multilayer composite sheets and being formed of at least one layer comprising polyepsiloncaprolactam and about 0.05 to 1 percent by weight, based upon the weight of the polyepsiloncaprolactam, of a dibasic carboxylic acid or anhydride or esters thereof, and at least one reinforcing mat of glass fibers encased within reinforcing layer. Also in accordance with this invention, a thermoplastic laminated composite sheet material useful in forming stamped articles having smooth surfaces is provided which comprises (a) at least one layer of polyepsiloncaprolactam containing short glass fibers and/or a particulate filler, and (b) a reinforcing layer adjoining and in contact with layer (a) comprising a sheet material comprising polyepsiloncaprolactam and about 0.05 to 1 percent by weight, based upon the weight of the polyepsiloncaprolactam, of a dibasic carboxylic acid or anhydride or ester thereof and at least one reinforcing mat of long glass fibers encased within layer (b). Further in accordance with this invention there is provided glass fibers having a surface coating comprising adhesion-promoting layer of a dibasic carboxylic acid or anhydride or ester thereof. In further accordance with this invention, there is provided an improvement in a process for providing a composite laminated sheet material which comprises the steps of forming a first layer of polyepsiloncaprolactam, forming a second reinforcement layer of thermoplastic resin and laminating the both layers together, the improvement comprising utilizing as the reinforcing layer a sheet material comprising polyepsiloncaprolactam and about 0.05 to 1 percent by weight, based upon the weight of the polyepsiloncaprolactam, of a dibasic carboxylic acid or anhydride or ester thereof. Especially preferred dibasic carboxylic acids include sebacic and azelaic acid.

It has been unexpectedly found that the inclusion of a very minor amount of the dibasic carboxylic acid to the polyepsiloncaprolactam provides enhanced wetting of the long glass fiber mat so as to provide less voids in the reinforcement layer. This results in enhanced and less variable physical properties due to the uniformity in the reinforcement layer as well as better porosity control and surface smoothness.

DESCRIPTION OF THE PREFERRED EMBODIMENTS

The first layer of the present invention may be formed by any suitable process, such as by first melt-blending the ingredients in an extruder and then extruding the mixture into a sheet. This layer contains from about 40 to 70 weight percent of polyepsiloncaprolactam of molding grade type (e.g., a weight average molecular weight of about 40,000 to 50,000) and preferably about 45 to 65 weight percent of the polymer; about 0 to 35 weight percent of short glass fibers, preferably about 5 to 25 percent of the short glass fibers; and about 0 to 50 weight percent, preferably about 10 to 30 percent, of a particulate filler. The short glass fibers have a length of about 0.01 to about 0.75 inch prior to the addition to the polymer and have a length of at least about 0.01 inch in the final product. The short fibers are randomly well dispersed throughout the polymer matrix and are predominantly two dimensionally oriented in the major plane of the sheet. That is, more than 50 percent of the fibers are aligned substantially parallel to the plane of the sheet. The glass fibers may be coated or otherwise provided with conventional agents such as sizing agents, coupling agents, lubricants, antistatic agents, wetting agents, and the like.

The particulate filler may be selected from a wide variety of minerals, metals, metal oxides, siliceous materials, metal salts and mixtures thereof. These fillers may also optionally be treated with various coupling agents or adhesion promoters as is known to those skilled in the art. Advantageous physical properties are achieved if the filler material has a Young's modulus of $10^7$ psi or greater and a Young's modulus at least twice as great as that of the polyamide. Examples of suitable fillers include alumina, aluminum hydrates, feldspar, asbestos, talc, calcium carbonates, clay, carbon black, quartz, novaculite and other forms of silica, koalinite, bentonite, garnet, mica, calcium oxide, calcium hydroxide, glass beads and the like.

The particulate filler and short glass fiber may be added to the molten thermoplastic resin at the same time or prior to one another. The mixtures are extruded or otherwise conventionally formed into a sheet of thermoplastic material of desired dimensions. Typical thicknesses of such layer may range from about 20 to 100 mils, preferably about 30 to 80 mils measured after lamination.

The reinforcement layer contains long glass fibers which typically may be in the form of a mat of fibers, strands or bundles of fibers of at least about 1.5 inch to continuous in length. The glass may be used in the form of filament, strand, thread, yarn, roving, scrim, or be non-woven, for example, and the strands or fibers comprising the reinforcing mat may be held together by resinous adhesive fibers or by needling or by the mechanical interaction of the randomly patterned web-like structure. The individual glass strands in the mat may be comprised of about 2 to 400, preferably 5 to 120, filaments per strand, with each filament having a diameter of about 0.0003 to about 0.001 inch, preferably about 0.00035 to 0.00085 inch. The glass mat typically may have a weight from about 0.3 to 10 ounces per square foot. The glass mat likewise may be treated with conventional agents enumerated above with respect to the short glass fibers.

In accordance with this invention, the polymeric matrix of the reinforcing layer comprises a blend of a polyepsiloncaprolactam and about 0.05 to 1 percent by weight, preferably about 0.1 to 0.5 percent by weight, based upon the weight of the polyepsiloncaprolactam, of a dibasic carboxylic acid or anhydride or ester thereof. The dibasic carboxylic acids or anhydrides or esters thereof which may be employed in the present invention can be aliphatic, alicyclic, aromatic or alkylaromatic. Such compounds preferably contain from 6 to 20 carbon atoms. Representative suitable acids (and anhydrides or ester thereof) include aliphatic acids such as adipic, pimelic, suberic, azelaic, sebacic, undecanedioic, dodecanedioic and tetradecanedioic; aromatic dicarboxylic acids such as terephthalic acid; alicyclic acids such as cyclohexane 1,4-dicarboxylic acid; and heterochain acids such as bis carboxymethyl ether of ethylene glycol; and mixtures thereof. The preferred dibasic carboxylic acids are the aliphatic acids and azelaic and sebacic acids are especially preferred. The blend is preferably prepared by melt blending the components in an extruder at a temperature of about 215° to 300° C. for about 1 to 15 minutes.

The reinforcing layer may contain as a third component from about 0 to 60 weight percent of a particulate filler, and preferably about 10 to 40 weight percent, of the filler. Suitable fillers include those disclosed above with respect to the first layer. The filler of the reinforcing layer may be the same or different from that of the first layer. The reinforcing layer typically has a thickness after lamination of about 30 to 80 mils, preferably about 35 to 70 mils.

The reinforcing layer is preferably formed during the lamination with the first layer. That is, any particulate filler and the polyepsiloncaprolactam is extruded into the form of a sheet and is advanced to a pair of nip rollers, for example, together with the reinforcing mat and the first sheet while the polymer matrix of the reinforcing layer is still in a molten condition. The nip rollers are spaced from one another a distance which is substantially less than the combined thicknesses of the layers prior to lamination. During lamination, the long glass mat is embedded in the reinforcing layer of polymer matrix and is encased by the polyamide material. The long glass fiber mat is preferably positioned between the first layer and the second layer during lamination although the fiber glass mat may alternatively by positioned on the opposite surface of the second layer from that surface which contacts the first layer or long glass fiber mats may be positioned on both sides of the second layer. Alternatively, more than one fiber glass layer may be positioned on one or two sides of the second layer.

Sometimes it may be preferable to provide an additional layer of polyepsiloncaprolactam containing short glass fibers and/or particulate filler adjacent to the opposite side of the reinforcing layer from the first layer such that the reinforcing layer is sandwiched between two layers of the same or similar composition. Moreover, additional layers of reinforcing layers or the first layers may be provided for a multi-ply laminate.

It has also been discovered that lamination of the long glass fiber mat to the reinforcing polymeric matrix is improved if the mat is pretreated with the dibasic carboxylic acid or anhydride or esters thereof. That is, the long glass fiber mat (which may be sized, etc.) may be coated with a solution of the dibasic carboxylic acid or anhydride or ester in a solvent such as, for example, isopropyl alcohol, and other lower alcohols, and the like, and the solvent driven off, prior to feeding the glass mat into the lamination stage. In this case, however, the reinforcing matrix for the long glass fiber mat need not and preferably does not contain any of the dibasic carboxylic acid or anhydride or ester thereof. In this manner, a coating of the adhesion-promoting composition can be applied substantially over the entire surface area of the fibers of the long glass fiber mat and in this manner provide excellent encasement of the fiber glass mat into the polymeric matrix. Although the amount of the acid or acid anhydride coated onto the fiber glass does not appear to be critical so long as the fibers are coated substantially over their entire surface area, suitable amounts may range for example from 5 to 100 weight percent, based on the weight of the mat. Preferred acids are azelaic and sebacic acid or anhydrides thereof. The acid or anhydride may be applied from a solution containing from about 1 to 30 weight percent solids and preferably about 2 to 15 weight percent solids.

The composite sheets of the present invention may be utilized to stamp parts such as automotive parts by a stamping technique such as is employed with metal stamping except for preheating of the thermoplastic composite sheet. That is, as disclosed in the aforementioned Ser. No. 616,732, the thermoplastic composite sheet is preheated to a temperature at or near the softening point of the polymer and is transferred to a metal stamping press wherein the sheet is stamped into a desired configuration and is thereafter removed from the press. Articles formed in this manner from the composite sheets of this ivention have excellent physical properties and surface smoothness.

Although it has been proposed in aforementioned U.S. Pat. No. 3,920,879 to add rather large amounts of sebacic acid to polyepsiloncaprolactam in order to reduce the molecular weight of the polymer, it has been found that such large amounts are not necessary to achieve the desired results in the present invention.

EXAMPLES

The following non-limiting examples further illustrate the invention.

EXAMPLE 1

Polyepsiloncaprolactam having a weight average molecular weight of about 42,000 was melt blended in a laboratory extruder with 1% by weight of sebacic acid and the blend was extruded into a sheet 20 mils thick. Into the sheet was pressed a continuous length glass fiber mat (Owens-Corning 8605) with the final thickness being about 30 mils. To both sides of this sheet were laminated under heat and pressure 40 mil sheets extruded from the same polyepsiloncaprolactam (without the sebacic acid). The composite structure was tested for its physical properties and the results are shown in Table I, below. The notched Izod impact text was used in these Examples.

EXAMPLE 2 (Comparative)

Example 1 was repeated except tht the first sheet did not contain any sebacic acid. The physical properties of the composite structure are also shown in Table 1.

TABLE 1

| Example | Flexural Strength (psi) | Flexural Modulus (psi) | Izod Impact (ft-lbs) |
|---|---|---|---|
| 1 | 19,680 | $0.63 \times 10^6$ | 3.0 |
| 2 | 18,150 | $0.64 \times 10^6$ | 2.0 |

As can be seen, the product of Example 1 showed enhanced Izod impact compared with the comparative example.

EXAMPLES 3-6

A solution of 5 weight percent sebacic acid in isopropyl alcohol was prepared at about 40° C. and a continuous length glass fiber mat was dipped into the solution, with the solvent being permitted to evolve. A substantially continuous coating of the fibers was observed. Various laminations were made including the coated mat and an uncoated mat as follows. In Example 3, the coated mat was sandwiched between two layers of the polyepsiloncaprolactam of Example 1 (thickness of 60 mils). In Example 4, Example 3 was repeated except that the mat was uncoated. In Example 5, the coated mat was sandwiched between two layers containing about 70% polyepsiloncaprolactam, about 20% of short glass fibers and about 10% of kaolin. Each layer had a thickness of about 50 mils. In Example 6, Example 5 was repeated except that the mat was uncoated. The Izod impact of each laminate was tested and the results are shown in Table 2, below.

TABLE 2

| Example | Izod Impact (ft. - lbs.) |
|---|---|
| 3 | 3.3 |
| 4 | 1.7 |
| 5 | 6.2 |
| 6 | 2.5 |

As can be seen, the impact strengths of the laminates of this invention were unexpectedly higher than the controls.

EXAMPLE 7

Two sheets were extruded at a temperature of about 260° C. from a blend of about 60% nylon 6, 30% short glass fibers and 10% kaolin. The sheets were fed to the nip of a pair of calendar rolls having surface temperatures of about 215° C. A reinforcing layer was extruded from a blend of 70% nylon 6 (containing 0.25 weight percent azelaic acid) and 30% glass beads at a temperature of 260° C. and was fed between the other two sheets to the nip. Two glass mats weighing about 1 ounce per square foot each were fed on each side of the reinforcing layer to the nip. The combined sheets were pressed by the nip into a cohesive layer which was cut into discrete blanks. The blanks had good surface properties and there was good adhesion of the mat to the reinforcing layer.

It is to be understood that variations and modifications of the present invention may be made without departing from the scope thereof. It is also to be understood that the present invention is not be limited by the specific embodiments disclosed herein but only in accordance with the appended claims when read in light of the foregoing specification.

I claim:

1. In a process for providing a composite laminated sheet material comprising the steps of forming a first layer comprising polyepsiloncaprolactam, forming a second reinforcing layer of thermoplastic resin and laminating said layers together while said resin is still in molten condition, the improvement comprising utilizing as said reinforcing layer a sheet material capable of being laminated immediately after extrusion and being formed of at least one layer comprising polyepsiloncaprolactam and about 0.05 to 1% by weight, based upon the weight of the polyepsiloncaprolactam, of a dibasic carboxylic acid or anhydride or ester thereof and at least one reinforcing mat of long glass fibers encased within said layer.

2. The process of claim 1 wherein an additional layer comprising polyepsiloncaprolactam is laminated to said reinforcing layer.

3. A process of forming a smooth-surfaced composite laminated sheet material comprising the steps of
 (a) extruding a first sheet comprising about 40 to 70 weight percent of polyepsiloncaprolactam, about 0 to 35 weight percent of short glass fibers and about 0 to 50 weight percent of a particulate filler;
 (b) extruding a second sheet comprising polyepsiloncaprolactam and about 0.05 to 1 percent by weight, based on the weight of the polyepsiloncaprolactam, of a dibasic carboxylic acid; and
 (c) feeding said first and second sheets and a long glass fiber mat into the nip of a set of laminating rolls whereby said glass mat is impregnated into said second sheet and said second sheet is bonded to said first sheet.

* * * * *